United States Patent
Lacy et al.

(10) Patent No.: US 8,334,749 B1
(45) Date of Patent: Dec. 18, 2012

(54) TEMPERATURE DETECTION IN A GAS TURBINE

(75) Inventors: Benjamin Lacy, Greenville, SC (US); Gilbert Kraemer, Greer, SC (US); Christian Stevenson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 574 days.

(21) Appl. No.: 12/568,348

(22) Filed: Sep. 28, 2009

(51) Int. Cl.
*H01C 7/10* (2006.01)

(52) U.S. Cl. .................. 338/22 R; 338/13; 338/296

(58) Field of Classification Search .............. 338/13, 338/25, 141, 147, 208, 218, 259, 296, 298; 374/5, 163, 179, 185
See application file for complete search history.

(56) References Cited

U.S. PATENT DOCUMENTS

| | | | | |
|---|---|---|---|---|
| 3,760,319 | A * | 9/1973 | Kawazoe | 338/26 |
| 4,228,425 | A * | 10/1980 | Cooke | 340/550 |
| 4,490,053 | A * | 12/1984 | Coston et al. | 374/5 |
| 5,592,149 | A * | 1/1997 | Alizi | 340/550 |
| 5,677,674 | A * | 10/1997 | Wolf | 340/541 |
| 5,831,511 | A | 11/1998 | Manning et al. | |
| 6,144,298 | A * | 11/2000 | Haimovich et al. | 340/564 |
| 6,180,867 | B1 | 1/2001 | Hedengren et al. | |
| 6,213,995 | B1 * | 4/2001 | Steen et al. | 604/527 |
| 6,354,735 | B2 | 3/2002 | Thermos et al. | |
| 7,436,313 | B2 * | 10/2008 | Bassilious et al. | 340/652 |
| 7,608,812 | B2 * | 10/2009 | Beinhocker | 250/227.14 |
| 7,719,400 | B1 * | 5/2010 | Bernier et al. | 338/25 |
| 2006/0261259 | A1 * | 11/2006 | Beinhocker | 250/227.15 |

* cited by examiner

*Primary Examiner* — Kyung Lee
(74) *Attorney, Agent, or Firm* — Nixon & Vanderhye, P.C.

(57) ABSTRACT

A temperature detector includes a first metal and a second metal different from the first metal. The first metal includes a plurality of wires and the second metal includes a wire. The plurality of wires of the first metal are connected to the wire of the second metal in parallel junctions. Another temperature detector includes a plurality of resistance temperature detectors. The plurality of resistance temperature detectors are connected at a plurality of junctions. A method of detecting a temperature change of a component of a turbine includes providing a temperature detector include ing a first metal and a second metal different from the first metal connected to each other at a plurality of junctions in contact with the component; and detecting any voltage change at any junction.

5 Claims, 3 Drawing Sheets

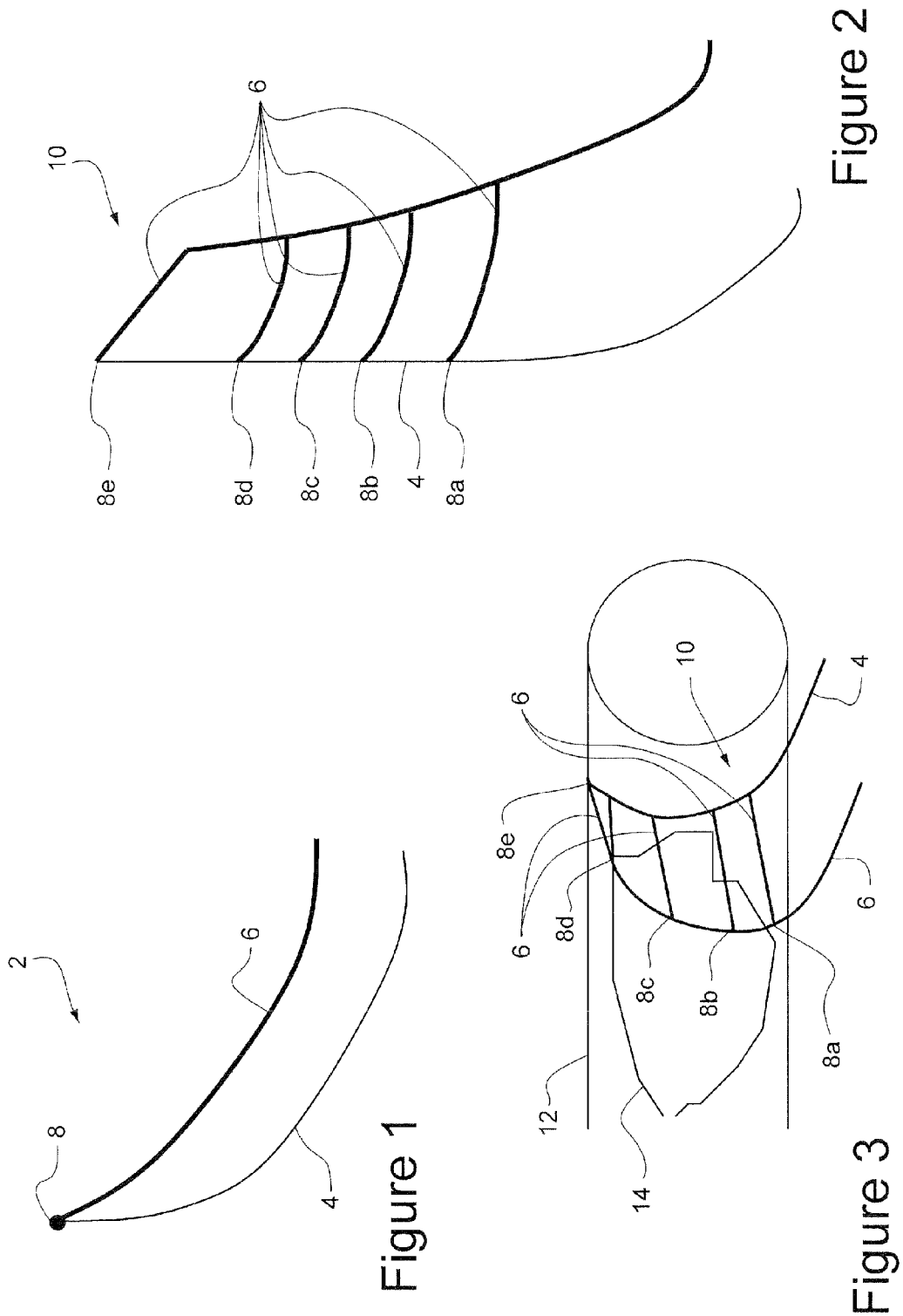

TEMPERATURE DETECTION IN A GAS TURBINE

STATEMENT REGARDING FEDERALLY SPONSORED RESEARCH OR DEVELOPMENT

This invention was made with Government support under Contract No. DE-FC26-05NT42643 awarded by the Department of Energy. The Government has certain rights in this invention.

FIELD OF THE INVENTION

The present invention relates to an apparatus and method for detecting flashback in the combustor of a gas turbine engine.

BACKGROUND OF THE INVENTION

Gas turbine manufacturers are regularly involved in research and engineering programs to produce new gas turbines that will operate at high efficiency and produce less undesirable air polluting emissions. The primary air polluting emissions usually produced by gas turbines burning conventional hydrocarbon fuels are oxides of nitrogen, carbon monoxide, and unburned hydrocarbons.

The oxidation of molecular nitrogen in air breathing engines is highly dependent upon the maximum hot gas temperature in the combustion system reaction zone. The rate of chemical reactions forming oxides of nitrogen (NOx) is a function of temperature. If the temperature of the combustion chamber hot gas is controlled to a sufficiently low level, thermal NOx will be reduced.

One method of controlling the temperature of the reaction zone of a combustor below the level at which thermal NOx is formed is to premix fuel and air to a lean mixture prior to combustion. The thermal mass of the excess air present in the reaction zone of a lean premixed combustor absorbs heat and reduces the temperature rise of the products of combustion to a level where production of thermal NOx is reduced.

There are several problems associated with dry low emissions combustors operating with lean premixing of fuel and air. Flammable mixtures of fuel and air exist within a premixing section of the combustor, which is external to the reaction zone of the combustor. One problem is a tendency for combustion to occur within the premixing section due to flashback. Flashback occurs when flame propagates from the combustor reaction zone into the premixing section. The flame held inside the wake flows behind the fuel injection columns (jet cross flow) or vane trailing edges.

Another problem is autoignition. Autoignition occurs when the dwell time and temperature for the fuel/air mixture in the premixing section are sufficient for combustion to be initiated without an igniter. The consequences of combustion in the premixing section are degradation of emissions performance and/or overheating and damage to the premixing section, which is typically not designed to withstand the heat of combustion.

Therefore, a problem to be solved is to prevent flashback, flame holding, and/or autoignition resulting in combustion within the premixing section. As flashback, flame holding and/or autoignition concerns rise due to use of more reactive fuels, the need for a reliable flashback detection method increases.

BRIEF DESCRIPTION OF THE INVENTION

According to one sample embodiment, a temperature detector comprises a first metal; and a second metal different from the first metal. The first metal comprises a plurality of wires and the second metal comprises a wire. The plurality of wires of the first metal are connected to the wire of the second metal in parallel junctions.

According to another sample embodiment, a temperature detector comprises a plurality of resistance temperature detectors. The plurality of resistance temperature detectors are connected at a plurality of junctions.

According to still another sample embodiment, a method of detecting a temperature change of a component of a turbine comprises providing a temperature detector comprising a first metal and a second metal different from the first metal connected to each other at a plurality of junctions in contact with the component; and detecting any voltage change at any junction.

According a further sample embodiment, a method to detect high temperatures in a component of a turbine comprises detecting a change in an electric current or pulsed signal through one or more wires caused by a change in the resistance of the one or more wires or by the one or more wires breaking.

BRIEF DESCRIPTION OF THE DRAWINGS

FIG. 1 schematically depicts a thermocouple for detecting temperature;

FIG. 2 schematically depicts a thermocouple net according to a sample embodiment;

FIG. 3 schematically depicts the thermocouple net of FIG. 2 provided in a burner tube of a combustor of a gas turbine engine;

DETAILED DESCRIPTION OF THE INVENTION

Figure 4:
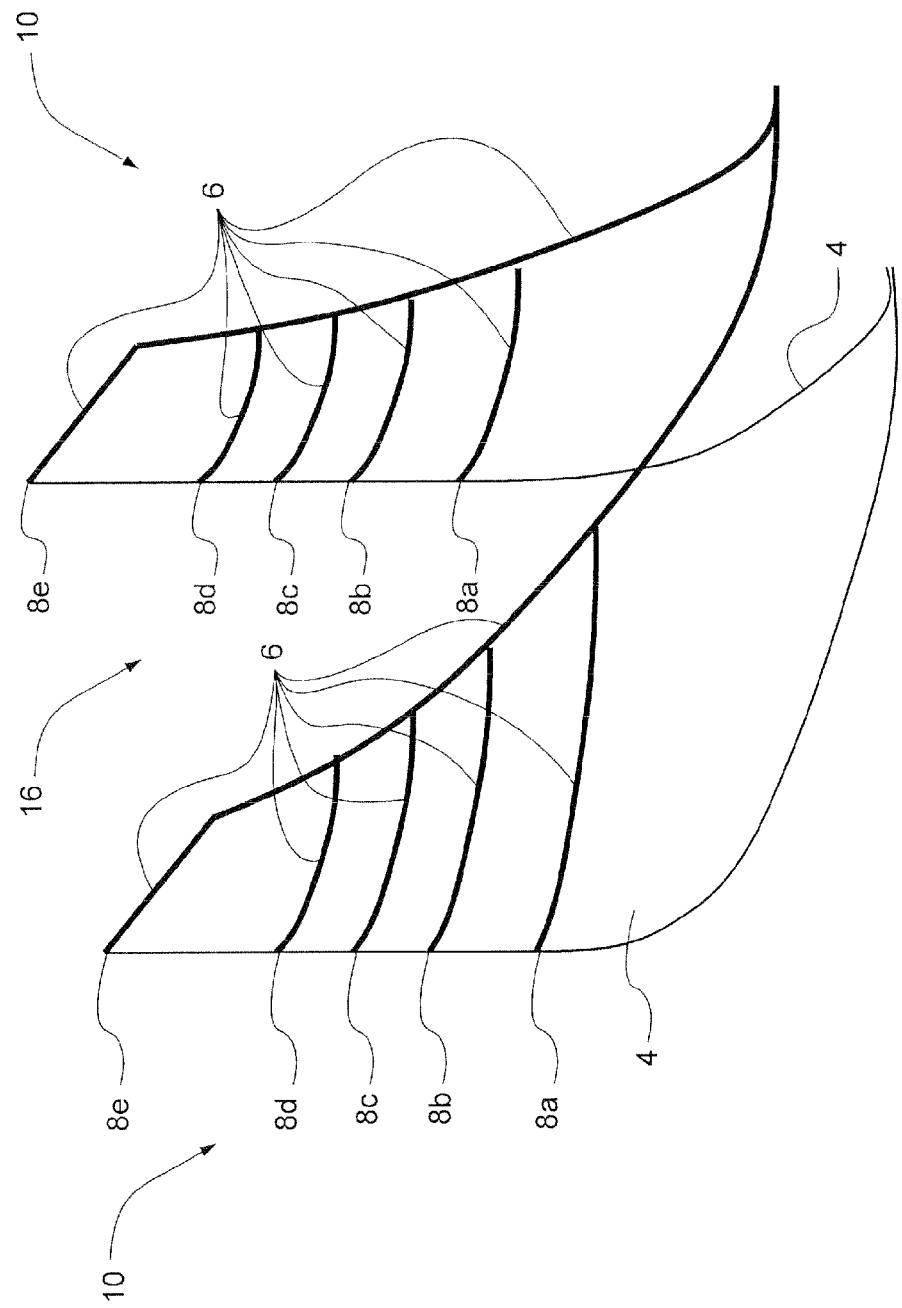
FIG. 4 schematically depicts thermocouple nets according to another sample embodiment.

Referring to FIG. 1, a thermocouple 2 comprises two dissimilar metals 4, 6 joined at one location, or junction, 8. Due to the Seebeck effect, a voltage is generated as a function of the temperature at the junction 8 (FIG. 1).

For flashback detection (or other temperature related transients that should be detected), measuring the exact temperature of the flame is unnecessary. Flashback may be detected by detecting temperature transients at multiple locations of combustion related components in a gas turbine so that operation can be shutdown quickly whenever temperature rises at any one of those locations. Referring to FIG. 2, a net 10 comprising parallel thermocouple junctions 8a-8e is formed by two dissimilar metals 4, 6. The net 10 provides a voltage change if any of the junctions 8a-8e on the net 10 experience a temperature change, for example a temperature rise.

In the event of a flame, if near junction 8a, the junction 8a will measure the correct, or highest, temperature change. If the flame is near junction 8e, the junction 8e will measure lower temperature change but a change will be detected that will indicate if a flame is occurring where it should not. Flame near junctions 8b-8d will register changes in the temperature between the junction 8a and the junction 8e.

Referring to FIG. 3, the net 10 may be placed on a component 12 of a gas turbine, for example, a burner tube, cap, or liner to detect temperature deviation wherever it occurs. A flashback flame 14, that may occur at multiple locations, may be detected by the net 10 and a single monitor (not shown).

Referring to FIG. 4, plural nets 10 of parallel junctions 8a-8e may be linked together to form a complete net 16. The net 16 may be connected to a single monitor (not shown). The monitor will read the strongest signal so that a temperature rise at any junction on the net 16 will be detected. This will allow detection over a large region of hardware with only a single monitor.

Figure 5:
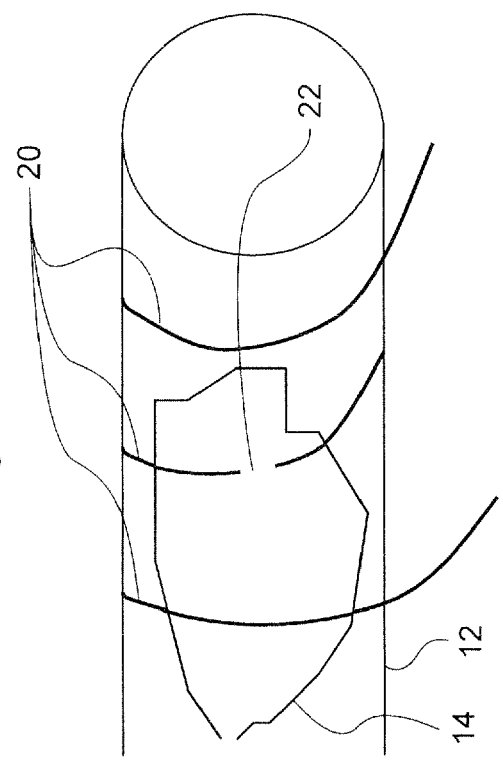
FIG. 5 schematically depicts flashback detection according to another sample embodiment.

An alternative embodiment may comprise a continuous resistance temperature detector (RTD) or wire 18 helically wound around a component 12 as shown in FIG. 5 and then detect temperature changes anywhere along the RTD or wire 18, caused for example by a flashback flame 14, by measuring resistivity changes to the RTD or wire 18. Alternatively, the temperature change can be detected by detecting changes in the frequency of a pulsed signal provided through the RTD or wire 18. It should be appreciated that a net of RTD's could be used similar to the net or nets previously described. For example, a first RTD may comprise a plurality of RTD elements of a first material that are connected to a second RTD element of a second material in parallel junctions.

Figure 6:
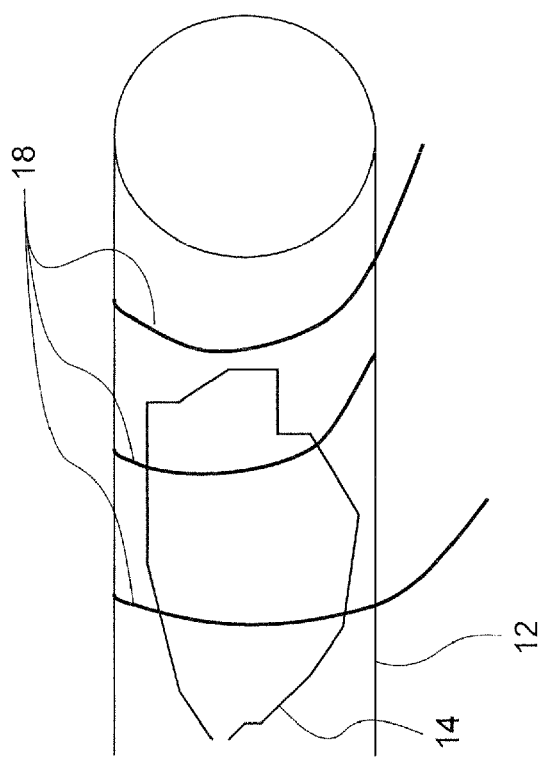
FIG. 6 schematically depicts flashback detection according to another sample embodiment.

Referring to FIG. 6, in another sample embodiment a low melting point wire 20 may be helically wound around the component 12. A rise in temperature may cause the low melting point wire 20 to fail open at 22 so that the temperature rise may be detected by noting the loss of a signal through the low temperature wire 20.

The use of a net, or nets, of thermocouple junctions, or of RTD's in series and/or in parallel may reduce the risk of component damages and/or allow increasing the operating capability of the gas turbine by allowing a way to mitigate risk. The use of a net, or nets, of thermocouple junctions, or of RTD's in series and/or in parallel, provides a reliable way for detecting flashback that doesn't require multiple sensors.

The net(s) and/or RTD's may be installed with combustion nozzles, burner tubes, a cap, or liner to detect and allow response to any temperature deviations. The net(s) and/or RTD's may also be used on any other component or product where significant temperature variation is a concern.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A temperature detector, comprising:
    a first metal; and
    a second metal different from the first metal, wherein the first metal comprises a plurality of wires and the second metal comprises a wire, and the plurality of wires of the first metal are connected to the wire of the second metal in parallel junctions, such that a temperature change at any one of said parallel junctions produces a voltage change as a function of the temperature at said one of said parallel junctions.

2. A method of detecting a temperature change of a component of a turbine, the method comprising:
    providing a temperature detector comprising a first metal and a second metal different from the first metal connected to each other at a plurality of junctions in contact with the component; and
    detecting any temperature-generated voltage change at any and of said plurality of junctions.

3. A method according to claim 2, wherein the first metal comprises one or more wires and the second metal comprises one or more wires, and the one or more wires of the first metal are connected to one or more wires of the second metal in parallel junctions.

4. A method according to claim 2, wherein the junctions are in contact with the component spirally along the component.

5. A method according to claim 2, wherein the component comprises a combustion nozzle, a burner tube, a cap and/or a liner.

* * * * *